(12) United States Patent
Longnos et al.

(10) Patent No.: US 11,886,333 B2
(45) Date of Patent: Jan. 30, 2024

(54) MEMORY BLOCK RECLAMATION METHOD AND APPARATUS

(71) Applicant: Huawei Technologies Co., Ltd., Shenzhen (CN)

(72) Inventors: Florian Longnos, Shenzhen (CN); Wei Yang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/194,182

(22) Filed: Mar. 31, 2023

(65) Prior Publication Data

US 2023/0325311 A1 Oct. 12, 2023

Related U.S. Application Data

(63) Continuation of application No. 16/863,440, filed on Apr. 30, 2020, now abandoned, which is a continuation of application No. PCT/CN2017/109808, filed on Nov. 7, 2017.

(51) Int. Cl.
*G06F 12/00* (2006.01)
*G06F 12/02* (2006.01)
*G06F 3/06* (2006.01)

(52) U.S. Cl.
CPC ........ *G06F 12/0238* (2013.01); *G06F 3/0604* (2013.01); *G06F 3/064* (2013.01); *G06F 3/0679* (2013.01); *G06F 2212/72* (2013.01)

(58) Field of Classification Search
CPC ...... G06F 3/0604; G06F 3/064; G06F 3/0679; G06F 12/0238; G06F 2212/72
See application file for complete search history.

(56) References Cited

U.S. PATENT DOCUMENTS

| | | | |
|---|---|---|---|
| 8,407,445 B1 | 3/2013 | Pathak et al. | |
| 10,261,725 B2* | 4/2019 | Hashimoto | ........... G06F 3/0604 |
| 10,275,352 B1* | 4/2019 | Balakrishnan | ...... G06F 12/0811 |
| 2005/0204092 A1 | 9/2005 | Masuyama et al. | |
| 2006/0117393 A1 | 6/2006 | Merry et al. | |
| 2011/0161559 A1 | 6/2011 | Yurzola et al. | |
| 2012/0131253 A1 | 5/2012 | Mcknight et al. | |

(Continued)

FOREIGN PATENT DOCUMENTS

| | | |
|---|---|---|
| CN | 1532708 A | 9/2004 |
| CN | 102047341 A | 5/2011 |

(Continued)

OTHER PUBLICATIONS

Yan Min., et al, "Design and Implement of High Capacity NAND Flash Memory Storage System with Open System Architecture," Microelectronics and Computer, vol. 26, No. 11, Nov. 2009, with an English Abstract, 4 pages.

(Continued)

*Primary Examiner* — Craig S Goldschmidt
(74) *Attorney, Agent, or Firm* — Conley Rose, P.C.

(57) ABSTRACT

A memory block reclamation method includes, after receiving an unmap command sent by a memory controller, a medium controller reclaims one or more memory blocks in a non-volatile memory connected to the medium controller based on memory logical address information in the unmap command. The one or more reclaimed memory blocks are available memory blocks.

20 Claims, 4 Drawing Sheets

(56) References Cited

U.S. PATENT DOCUMENTS

| | | |
|---|---|---|
| 2012/0260349 A1 | 10/2012 | Nagai et al. |
| 2013/0246722 A1 | 9/2013 | Suzuki et al. |
| 2013/0290608 A1 | 10/2013 | Nelogal et al. |
| 2014/0006689 A1 | 1/2014 | Hashimoto |
| 2014/0149659 A1 | 5/2014 | Gschwind |
| 2016/0147442 A1 | 5/2016 | Baderdinni et al. |
| 2016/0299715 A1 | 10/2016 | Hashimoto et al. |
| 2017/0102873 A1 | 4/2017 | Hanson et al. |
| 2017/0147258 A1 | 5/2017 | Kim |
| 2017/0206165 A1 | 7/2017 | Lim |
| 2017/0255383 A1 | 9/2017 | Chang et al. |
| 2018/0074708 A1 | 3/2018 | Gerhart et al. |
| 2018/0121088 A1 | 5/2018 | Doshi et al. |
| 2018/0314657 A1* | 11/2018 | Chen .................. G06F 13/4282 |
| 2019/0026325 A1 | 1/2019 | Todd |
| 2019/0056999 A1* | 2/2019 | Foxworth ................ G11C 7/20 |
| 2020/0117616 A1 | 4/2020 | Parker et al. |

FOREIGN PATENT DOCUMENTS

| | | |
|---|---|---|
| CN | 102622309 A | 8/2012 |
| CN | 102622310 A | 8/2012 |
| CN | 103559138 A | 2/2014 |
| CN | 103577343 A | 2/2014 |
| CN | 103970680 A | 8/2014 |
| CN | 103984641 A | 8/2014 |
| CN | 105760311 A | 7/2016 |
| CN | 106980541 A | 7/2017 |
| CN | 107291625 A | 10/2017 |
| JP | 2005258804 A | 9/2005 |
| JP | 2008217183 A | 9/2008 |
| JP | 2014232543 A | 12/2014 |
| JP | 2015501960 A | 1/2015 |
| JP | 2016206938 A | 12/2016 |
| JP | 2017157214 A | 9/2017 |

OTHER PUBLICATIONS

Lei Bingbing, et al, "Garbage collection algorithm for NAND flash memory based on logical region heat," Journal of Computer Applications, Apr. 2017, with an English Abstract, 5 pages.

* cited by examiner

MEMORY BLOCK RECLAMATION METHOD AND APPARATUS

CROSS-REFERENCE TO RELATED APPLICATIONS

This is a continuation of U.S. patent application Ser. No. 16/863,440, filed on Apr. 30, 2020, which is a continuation of International Patent Application No. PCT/CN2017/109808, filed on Nov. 7, 2017. All of the aforementioned patent applications are hereby incorporated by reference in their entireties.

TECHNICAL FIELD

The present disclosure relates to the field of computer technologies, and in particular, to a memory block reclamation method and apparatus.

BACKGROUND

A non-volatile dual in-line memory module (NVDIMM) is a random access memory (RAM) of a computer. The NVDIMM may include a plurality of non-volatile memory (NVM) chips. The NVDIMM can still store complete memory data even when a system is completely powered off. It can be understood that the NVM chip on the NVDIMM may further be a non-volatile random access memory (NVRAM). The NVM on the NVDIMM may include a phase change memory (PCM), a resistive random access memory (RRAM), a magnetic random access memory (MRAM), a spin-transfer torque magnetic random access memory (STT MRAM), and the like. The NVDIMM communicates with a memory controller using an NVDIMM-P protocol. The NVDIMM-P protocol is a bus access protocol compatible with a double data rate (DDR) protocol.

However, compared with a dynamic random access memory (DRAM), the NVM has poor fatigue resistance and a limited quantity of write times. Therefore, when some memory blocks in the NVM chip reach the maximum write times, the NVM chip is unavailable, and a service life of the entire NVDIMM is affected. To avoid unbalanced write times of different memory blocks in the NVM chip, enhance a wear leveling effect, and prolong a service life of the NVDIMM, memory management needs to be performed on the NVDIMM.

SUMMARY

Embodiments of the present disclosure provide a memory block reclamation method and apparatus, to improve a memory block reclamation speed and enhance a wear leveling effect.

According to a first aspect, an embodiment of the present disclosure provides a memory block reclamation method, where the method is applied to a computer system, the computer system includes a memory controller, a medium controller, and an NVM connected to the medium controller, the memory controller communicates with the medium controller using an NVDIMM-P protocol, the NVM includes a plurality of memory blocks, and the method includes receiving, by the medium controller, an unmap command sent by the memory controller, where the unmap command includes memory logical address information of a to-be-reclaimed memory block, and reclaiming, by the medium controller, the memory block based on the memory logical address information, where the reclaimed memory block is an available memory block.

After receiving the unmap command sent by the memory controller, the medium controller releases a corresponding memory block and reclaims the memory block, based on the memory logical address information of the to-be-reclaimed memory block included in the unmap command, thereby enhancing a medium management operation effect of the medium controller, improving storage performance of an NVDIMM, and prolonging a service life of the NVDIMM.

In a possible implementation, the reclaiming, by the medium controller, the memory block based on the memory logical address information includes deleting, by the medium controller, a mapping relationship between a memory logical address and a corresponding memory physical address of the memory block based on the memory logical address information, and adding, by the medium controller, the memory physical address of the memory block to a memory idle list.

Because the medium controller can delete the mapping relationship between the memory logical address and the corresponding memory physical address of the memory block in time, a quantity of available memory blocks can be increased, an effect of wear leveling between the memory blocks can be enhanced, performance of the NVDIMM can be improved, and a service life of the NVDIMM can be prolonged. In this way, the memory module is managed when the NVDIMM is used as a memory.

In a possible implementation, the memory logical address information includes a start address and length information of the to-be-reclaimed memory block, the start address is used to indicate a first address of the to-be-reclaimed memory block, and the length information is used to indicate a quantity of to-be-reclaimed memory blocks.

In a possible implementation, the unmap command further includes erasure mode indication information, and the method further includes, when the erasure mode indication information instructs to erase data information in the memory block, writing, by the medium controller, pre-defined pattern into the memory block.

In this implementation, the unmap command further includes the erasure mode indication information. In this case, the medium controller can be instructed to overwrite sensitive data with the pre-defined pattern when the data in the memory block is sensitive data, thereby protecting the sensitive data and improving security of the NVDIMM.

In a possible implementation, the method further includes receiving, by the medium controller, a read command sent by the memory controller, where the read command includes memory logical address information of to-be-read data, determining, by the medium controller, that no corresponding memory physical address is found based on the memory logical address information, and sending, by the medium controller, error response information to the memory controller, where the error response information is used to indicate that the read command fails to be executed.

According to a second aspect, an embodiment of the present disclosure further provides a memory block reclamation method. The method is applied to a computer system, the computer system includes a processor, a memory controller, a medium controller, and an NVM connected to the medium controller, the memory controller communicates with the medium controller using an NVDIMM-P protocol, the NVM includes a plurality of memory blocks, and the method includes receiving, by the memory controller, a trim instruction sent by the processor, where the trim instruction includes memory logical address information of a to-be-reclaimed memory block, and sending, by the memory controller, an unmap command to the medium controller.

The unmap command includes the memory logical address information of the to-be-reclaimed memory block, the unmap command is used to instruct the medium controller to reclaim the memory block, and the reclaimed memory block is an available memory block.

In a possible implementation, the memory logical address information includes a start address and length information of the to-be-reclaimed memory block, the start address is used to indicate a first address of the to-be-reclaimed memory block, and the length information is used to indicate a quantity of to-be-reclaimed memory blocks.

In a possible implementation, the unmap command further includes erasure mode indication information, and when the erasure mode indication information instructs to erase data information in the memory block, the unmap command is further used to instruct the medium controller to write pre-defined pattern into the memory block.

In a possible implementation, the method further includes sending, by the memory controller, a read command to the medium controller, where the read command includes memory logical address information of to-be-read data, and receiving, by the memory controller, error response information sent by the medium controller, where the error response information is used to indicate that the read command fails to be executed.

According to a third aspect, an embodiment of the present disclosure further provides a memory configured to perform the memory block reclamation method in the first aspect. The memory has a same technical feature and technical effect as that in the first aspect. Details are not described in the present disclosure again.

A third aspect of the embodiments of the present disclosure provides a memory, including a medium controller and an NVM connected to the medium controller, where the medium controller communicates with a memory controller of a processor using an NVDIMM-P protocol, the NVM includes a plurality of memory blocks, and the medium controller is configured to receive an unmap command sent by the memory controller, where the unmap command includes memory logical address information of a to-be-reclaimed memory block, and reclaim the memory block based on the memory logical address information, where the reclaimed memory block is an available memory block.

In an optional implementation, the memory controller is further configured to delete a mapping relationship between a memory logical address and a corresponding memory physical address of the memory block based on the memory logical address information, and add the memory physical address of the memory block to a memory idle list.

In a possible implementation, the memory logical address information includes a start address and length information of the to-be-reclaimed memory block, the start address is used to indicate a first address of the to-be-reclaimed memory block, and the length information is used to indicate a quantity of to-be-reclaimed memory blocks.

In a possible implementation, the unmap command further includes erasure mode indication information, and the medium controller is further configured to, when the erasure mode indication information instructs to erase data information in the memory block, write pre-defined pattern into the memory block.

In an optional implementation, the medium controller is further configured to receive a read command sent by the memory controller, where the read command includes the memory logical address information of the to-be-read data, determine that no corresponding memory physical address is found based on the memory logical address information, and send error response information to the memory controller, where the error response information is used to indicate that the read command fails to be executed.

According to a fourth aspect, an embodiment of the present disclosure further provides a computer system. The computer system includes a processor, a memory controller, a medium controller, and an NVM connected to the medium controller, the memory controller communicates with the medium controller using an NVDIMM-P protocol, the NVM includes a plurality of memory blocks, and the memory controller is configured to receive a trim instruction sent by the processor, where the trim instruction includes memory logical address information of a to-be-reclaimed memory block, and send an unmap command to the medium controller, where the unmap command includes the memory logical address information of the to-be-reclaimed memory block, and the unmap command is used to instruct the medium controller to reclaim the memory block.

The medium controller is configured to receive the unmap command sent by the memory controller, and reclaim the memory block based on the memory logical address information, where the reclaimed memory block is an available memory block.

In a possible implementation, the memory logical address information includes a start address and length information of the to-be-reclaimed memory block, the start address is used to indicate a first address of the to-be-reclaimed memory block, and the length information is used to indicate a quantity of to-be-reclaimed memory blocks.

In a possible implementation, the unmap command further includes erasure mode indication information, and the medium controller is further configured to, when the erasure mode indication information instructs to erase data information in the memory block, write pre-defined pattern into the memory block.

In a possible implementation, the memory controller is further configured to receive a memory access request sent by a processor, where the memory access request includes memory logical address information of to-be-read data.

The memory controller is further configured to send a read command to the medium controller based on the memory access request, where the read command carries the memory logical address information.

The medium controller is further configured to determine that no corresponding memory physical address is found based on the memory logical address information, and send error response information to the memory controller, where the error response information is used to indicate that the read command fails to be executed.

The memory controller is further configured to send read failure information to the processor based on the error response information.

BRIEF DESCRIPTION OF DRAWINGS

To describe the technical solutions in embodiments of the present disclosure more clearly, the following briefly describes accompanying drawings required for describing the embodiments. It is clear that the accompanying drawings in the following description show merely some embodiments of the present disclosure.

DESCRIPTION OF EMBODIMENTS

To make a person skilled in the art understand the technical solutions in the present disclosure better, the following clearly describes the technical solutions in the embodiments of the present disclosure with reference to accompanying drawings in the embodiments of the present disclosure. It is clear that the described embodiments are merely some but not all of the embodiments of the present disclosure.

Figure 1:
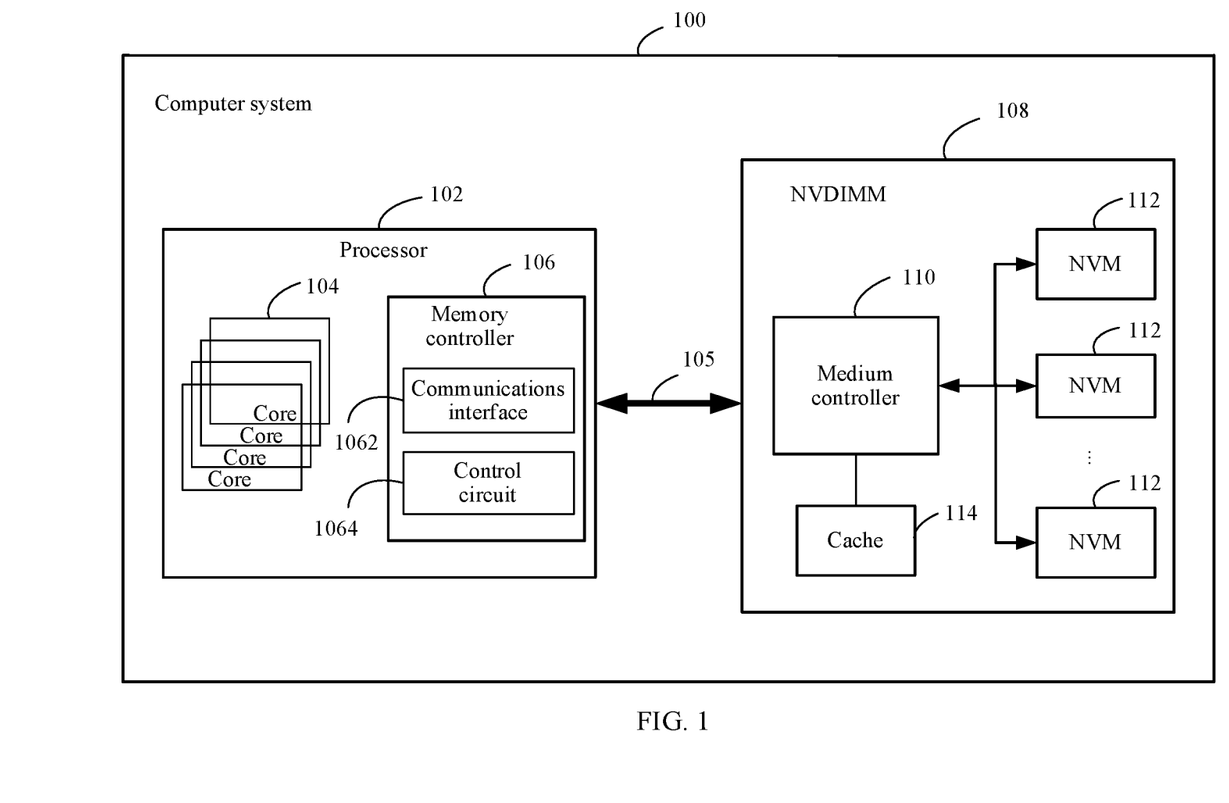
FIG. 1 is a schematic architectural diagram of a computer system according to an embodiment of the present disclosure.

FIG. 1 is a schematic architectural diagram of a computer system according to an embodiment of the present disclosure. As shown in FIG. 1, the computer system 100 may include at least a processor 102, a memory controller 106, and an NVDIMM 108. Usually, the memory controller 106 may be integrated into the processor 102. It should be noted that, in addition to the components shown in FIG. 1, the computer system 100 may further include a communications interface and another component such as a disk that is used as an external storage device. This is not limited herein.

The processor 102 is a computing core and a control core of the computer system 100. The processor 102 may include one or more processor cores 104. The processor 102 may be a very large scale integrated circuit. An operating system and another software program are installed on the processor 102 such that the processor 102 can access the NVDIMM 108, a cache, and a disk. It can be understood that, in this embodiment of the present disclosure, the core 104 in the processor 102 may be, for example, a central processing unit (CPU), or may be another application-specific integrated circuit (ASIC).

The memory controller 106 is a bus circuit controller that controls the NVDIMM 108 inside the computer system 100 and that is configured to manage and plan data transmission from the NVDIMM 108 to the core 104. Data may be exchanged between the NVDIMM 108 and the core 104 using the memory controller 106. The memory controller 106 may be a separate chip, and is connected to the core 104 using a system bus. A person skilled in the art may learn that the memory controller 106 may alternatively be integrated into the processor 102 (as shown in FIG. 1), or may be built into a northbridge. A specific location of the memory controller 106 is not limited in this embodiment of the present disclosure. In an actual application, the memory controller 106 may include a communications interface 1062 and a control circuit 1064, and the memory controller 106 may communicate with the processor 102 and the NVDIMM 108 through the communications interface 1062. The memory controller 106 may control, using the control circuit 1064, necessary logic to write data to the NVDIMM 108 or read data from the NVDIMM 108.

The NVDIMM 108 is a RAM of the computer system 100, and may be used as a memory or a storage device of the computer system 100. The NVDIMM 108 may include a medium controller 110, at least one NVM 112, and one or more caches 114. The medium controller 110 may include a logic circuit having a control capability. The NVM 112 is configured to store various software currently running in an operating system, input and output data, information that is exchanged with an external storage device, and the like. The NVM 112 may exist in a chip form. For example, the NVM 112 may include a NVM that can be used as memory, such as a PCM, a RRAM, a MRAM, or a STT MRAM.

The memory controller 106 is connected to the NVDIMM 108 using a bus 105. The memory controller 106 communicates with the NVDIMM 108 in compliance with an NVDIMM-P protocol. The NVDIMM-P protocol is an asynchronous protocol compatible with a DDR protocol. The medium controller 110 may access, based on a memory access command of the memory controller 106, data stored in the NVM 112. It can be understood that the memory access command sent by the memory controller 106 may be a read command or a write command. The medium controller 110 may read data from the NVM 112 and store the data in a read buffer, based on the read command sent by the memory controller 106, and send an asynchronous signal to the memory controller 106 to instruct the memory controller 106 to read data from the read buffer, or the medium controller 110 may first store data in a write buffer, and write the data in the write buffer into the NVM 112 or the cache 114, based on the write command sent by the memory controller 106.

In this embodiment of the present disclosure, the bus 105 may include at least a data bus and a command/address bus. The data bus is configured to transmit data and metadata. The command/address bus is configured to transmit a memory access command such as a read command or a write command. The cache 114 is configured to cache data that is read by the medium controller 110 from the NVM 112.

To prolong a service life of the NVDIMM and improve performance of the NVDIMM, the medium controller needs to perform different medium management operations, for example, wear leveling, bad block management, and data migration between a cache and an NVM. The wear leveling means that data is evenly distributed to each memory block of the NVDIMM as much as possible, to ensure that quantities of erasure/write times of the memory blocks are the same in order to prolong the service life of the NVDIMM. When allocating a new memory block to data, the medium controller preferentially selects a memory block with a smaller quantity of wear times from a memory idle list. Bad block management means that after it determined that the memory block is a bad block a new memory block is selected from the memory idle list for data in the current bad block. Data migration between the cache and the NVM is to store frequently accessed data in the cache, and migrate infrequently accessed data to the NVM in order to improve a processing speed of a read/write request. However, when data in the cache is written into the NVM, a new memory block needs to be selected from the memory idle list for the data in the cache. It can be learned from the foregoing analysis that, a timely update of the memory idle list determines a management effect of a medium management operation of the medium controller, and further affects the service life and the performance of the NVDIMM.

To improve efficiency of the foregoing medium management operation, the embodiments of the present disclosure provide a memory block reclamation method and apparatus.

The following describes in detail, with reference to specific embodiments, a memory block reclamation method and apparatus provided in the embodiments of the present disclosure. In the following specific embodiments, same or similar concepts or processes may not be described in detail in some embodiments.

Figure 2:
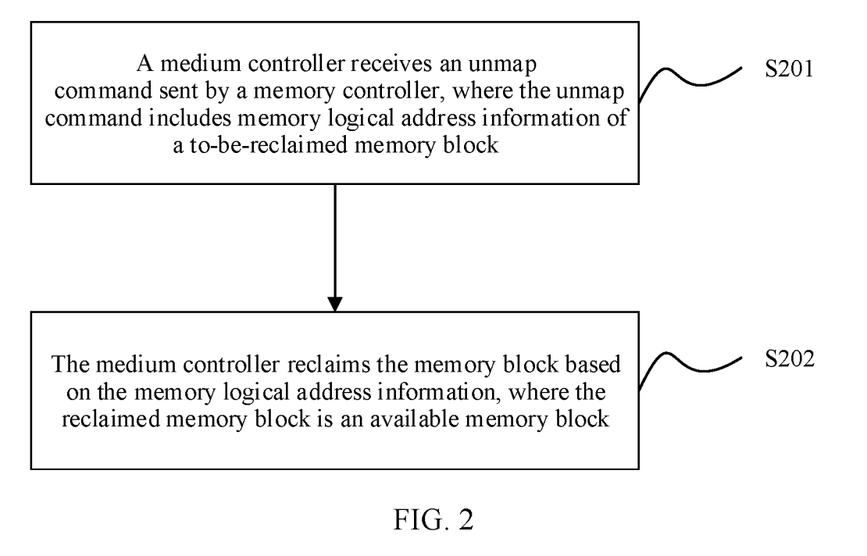
FIG. 2 is a schematic flowchart of a memory block reclamation method according to Embodiment 1 of the present disclosure.

One aspect of the embodiments of the present disclosure provides a memory block reclamation method. FIG. 2 is a schematic flowchart of a memory block reclamation method according to Embodiment 1 of the present disclosure. In this embodiment, a medium controller receives an unmap command sent by a memory controller, reclaims a memory block based on the unmap command, and converts the memory block into an available memory block, thereby enhancing a management effect of a medium management operation of the medium controller, further improving storage performance of an NVDIMM, and prolonging a service life of the NVDIMM. As shown in FIG. 2, the memory block reclamation method provided in this embodiment is applied to the computer system shown in FIG. 1. For example, the memory block reclamation method may be executed by the medium controller in FIG. 1. The computer system includes a memory controller, a medium controller, and an NVM connected to the medium controller. The memory controller communicates with the medium controller using an NVDIMM-P protocol. The NVM includes a plurality of memory blocks. The memory block reclamation method includes the following steps.

S201. The memory controller sends an unmap command to the medium controller, where the unmap command includes memory logical address information of a to-be-reclaimed memory block.

For example, when receiving an access request sent by the memory controller, the medium controller usually allocates a corresponding memory physical address to a memory logical address in the access request, and stores a mapping relationship between the memory logical address and the memory physical address. When the memory controller reads or writes the memory logical address, the medium controller may read or write data corresponding to the corresponding memory physical address based on the mapping relationship. When the medium controller allocates the memory physical address to the memory logical address, the medium controller selects a memory block from a memory idle list. To ensure a wear leveling effect between memory blocks in an NVM chip, it should be ensured that an unused memory block is converted into an available memory block in time in order to avoid cases in which some memory blocks cannot participate in medium management, memory resources are wasted, and the service life of the NVDIMM is shortened. To achieve the foregoing objectives, the memory controller sends the unmap command to the medium controller. The unmap command carries the memory logical address information of the to-be-reclaimed memory block. The unmap command is used to instruct the medium controller to reclaim the memory block based on the unmap command. When receiving the unmap command, the medium controller may determine the memory physical address information of the to-be-reclaimed memory block based on the memory logical address information of the to-be-reclaimed memory block in the unmap command.

S202. The medium controller reclaims the memory block based on the memory logical address information, where the reclaimed memory block is an available memory block.

For example, the medium controller reclaims a specified memory block based on the memory logical address information in the unmap command. The reclaimed memory block is an available memory block, and the medium controller may manage the memory block when performing medium management such as wear leveling. When releasing an object, an existing memory controller usually does not send, to the medium controller, an unmap command of a memory block occupied by data corresponding to the object.

In this embodiment, the unmap command is sent to the medium controller, and the specified memory block is reclaimed such that the memory block is converted into an available memory block, and an unused memory block can be released as soon as possible. This avoids comparatively high overheads caused by over-allocation. In this way, the unused memory block can be managed in a medium management operation as early as possible, thereby improving storage performance of the NVDIMM and prolonging a service life of the NVDIMM.

An embodiment of the present disclosure provides a memory block reclamation method. The method includes receiving, by a medium controller, an unmap command sent by a memory controller, where the unmap command includes memory logical address information of a to-be-reclaimed memory block, and reclaiming, by the medium controller, the memory block based on the memory logical address information, where the reclaimed memory block is an available memory block. After receiving the unmap command sent by the memory controller, the medium controller releases a corresponding memory block and reclaims the memory block, based on the memory logical address information of the to-be-reclaimed memory block included in the unmap command, thereby enhancing a medium management operation effect of the medium controller, improving storage performance of an NVDIMM, and prolonging a service life of the NVDIMM.

Figure 3:
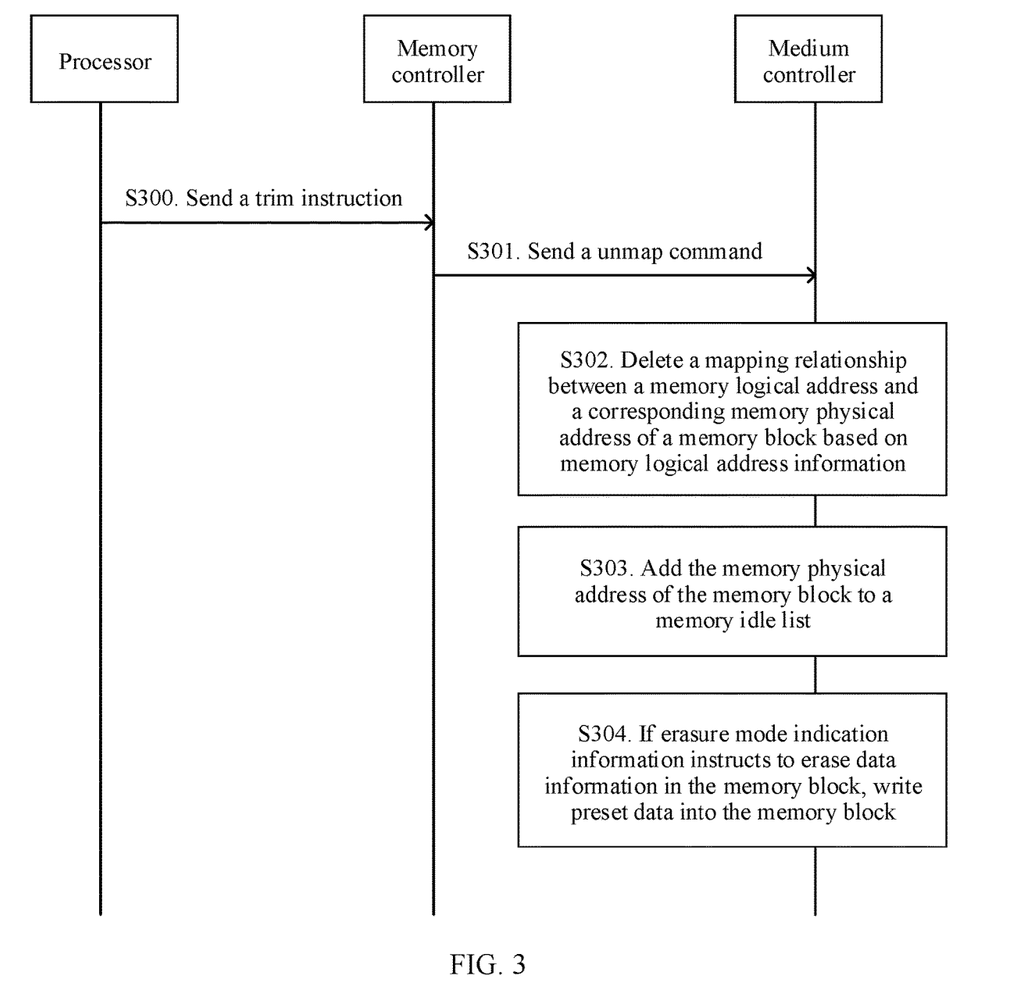
FIG. 3 is a signaling flowchart of a memory block reclamation method according to Embodiment 2 of the present disclosure.

For example, based on the embodiment shown in FIG. 2, an embodiment of the present disclosure further provides a memory block reclamation method. FIG. 3 is a signaling flowchart of a memory block reclamation method according to Embodiment 2 of the present disclosure. In this embodiment, a specific process in which a medium controller reclaims a memory block based on an unmap command is described in detail. As shown in FIG. 3, the memory block reclamation method includes the following steps.

S301. The medium controller receives an unmap command sent by the memory controller, where the unmap command includes memory logical address information of a to-be-reclaimed memory block.

For example, S301 in this embodiment is the same as S201 in the embodiment shown in FIG. 2. Details are not described again in the present disclosure.

Optionally, in the embodiments shown in FIG. 2 and FIG. 3, the memory logical address information includes a start address and length information of the to-be-reclaimed memory block, the start address is used to indicate a first address of the to-be-reclaimed memory block, and the length information is used to indicate a quantity of to-be-reclaimed memory blocks.

For example, when reclaiming a memory block, the medium controller determines, based on the start address of the to-be-reclaimed memory block in the unmap command and a total length of the to-be-reclaimed memory block, to-be-reclaimed memory blocks corresponding to specific addresses in the memory physical address. For example, when the to-be-reclaimed memory block includes consecutive memory blocks 1, 2, and 3, the start address may be, for example, a first address of the memory block 1, and length information may be 3. Optionally, the memory controller and the medium controller agree on a granularity of a memory block. Optionally, the unmap command may further include granularity size information of a memory block.

Optionally, based on the foregoing embodiments, before S301, the memory block reclamation method further includes the following step.

S300. The memory controller receives a trim instruction sent by a processor, where the trim instruction includes the memory logical address information of the to-be-reclaimed memory block.

For example, the processor (for example, any processor core 104 in FIG. 1) sends a trim instruction to the memory controller, and after receiving the trim instruction, the memory controller sends an unmap command to the medium controller. The trim instruction is a command that is used by an operating system to notify the memory of which memory blocks are no longer used and that can be erased.

Specifically, when the operating system running in the processor deletes an object, the medium controller cannot learn that the object has been deleted, and the medium controller still stores a mapping relationship between a logical address and a physical address. Therefore, in this embodiment of the present disclosure, when an object file is deleted, the processor may send a trim instruction to the memory controller, where the trim instruction carries an address of a memory block, and the trim instruction is used to notify the memory controller that an object corresponding to data of the memory block has been deleted, the data of the memory block may be deleted, and the memory block may be reclaimed.

In an actual application, when the processor detects any one of the following cases, the processor sends a trim instruction to the memory controller an object and data corresponding to the object are released, a memory block whose size exceeds a preset size is released, an application ends, a quantity of read/write requests of the memory is less than a preset quantity, or the processor determines, based on a preset operating system memory management algorithm, that a trim instruction needs to be sent.

For example, when the processor detects that an object is released, the processor sends a trim instruction to the memory controller to reclaim a memory block occupied by the object. Optionally, to reduce signaling interaction between the processor core and the memory controller, when the processor detects that a memory block whose size exceeds a preset size is released, the processor sends a trim instruction to the memory controller to reclaim the memory block. Optionally, when detecting that an application ends, the processor sends a trim instruction to the memory controller to reclaim a memory block occupied by the application. Optionally, when detecting that there are a comparatively small quantity of read/write requests, that is, when the memory is idle, the processor sends a trim instruction to the memory controller in order to avoid releasing the memory when the memory is busy, thereby improving read/write performance of the memory. Optionally, the processor may alternatively send a trim instruction to the memory controller when determining, based on a preset operating system memory management algorithm, that the trim instruction needs to be sent.

In an actual application, a fourth-generation double data rate (DDR4) synchronization interface or a fifth-generation double data rate (DDR5) synchronization interface may be used between the medium controller and the memory controller. When different DDR interfaces are used, formats of unmap commands sent by the memory controller to the medium controller are different.

In a first possible implementation, the DDR4 interface is used between the medium controller and the memory controller, and a format of the unmap command is shown in the following Table 1.

TABLE 1

| Location Identifier | | First clock beat Unmap command | Second clock beat Address extension command |
|---|---|---|---|
| CKE_0 | Previous | H | H |
| | Current | H | H |
| CS | | L | L |
| ACT | | H | ADDR[22:12] |
| A16 | | L | |
| A15 | | H | |
| A14 | | H | |
| C0-C2 | | ADDR[39:33] | |
| BG0-BG1 | | | |
| BA0-BA1 | | | |
| A17 | | L | LENGTH[4:0] |
| A12 | | L | |
| A13 | | L | |
| A11 | | H | |
| A10 | | OPCODE[0] | |
| A0-A9 | | ADDR[32:23] | ADDR[11:2] |

For example, due to a limited length of the unmap command, complete address information of the to-be-reclaimed memory block cannot be carried. Therefore, after sending the unmap command, the memory controller usually further sends an address extension command. The unmap command and the address extension command are sent back-to-back. In an embodiment, the memory controller alternately sends the unmap command and the address extension command. For example, after sending a first unmap command at a first clock beat, the memory controller sends a first address extension command at a second clock beat, and then sends a second unmap command and a second address extension command at subsequent clock beats in sequence. The unmap command and the address extension command are sent at two clock beats. A format of the address extension command is also shown in Table 1. One clock beat is one clock change edge, and the change edge may be a rising edge or a falling edge.

For example, as shown in Table 1, in the unmap command and the address extension command, high (H) represents binary data 1, and low (L) represents binary data 0. The clock enable (CKE0) bit is used to indicate a clock enable signal, the previous (previous cycle) bit is used to indicate whether a previous clock is valid, and the current (current cycle) bit is used to indicate whether a current clock is valid. As shown in Table 1, when both the previous bit and the current bit are H, the clock enable signal is valid, and the medium controller receives the unmap command when the clock enable signal is valid. Chip select (CS) is a chip select signal. There are a plurality of memory modules on the memory channel, and the memory controller may determine, using the chip select signal, a memory module that receives the unmap command and the address extension command. When a chip selection signal received by a memory module is L, it indicates that the memory module is selected, to receive an unmap command and an address extension command. The ADDR[39:2] field is used to store the start address of the to-be-reclaimed memory block. In other words, the ADDR[39:2] is the start address of the to-be-reclaimed memory block, that is, the start address of the first to-be-reclaimed memory block. The LENGTH[4:0] is used to indicate the length information of the to-be-reclaimed memory block, and may be further used to indicate a quantity of the to-be-reclaimed memory blocks. Using the LENGTH[4:0] as an example, a maximum value of the LENGTH[4:0] field is 32. In this case, one unmap command may be used to instruct to reclaim 32 memory blocks. The OPCODE[0] field is used to indicate erasure mode information.

In a second possible implementation, the DDR5 interface is used between the medium controller and the memory controller, and a format of the unmap command is shown in the following Table 2.

TABLE 2

|  | Location identifier | CS | CA0 | CA1 | CA2 | CA3 | CA4 | CA5 | CA6 |
|---|---|---|---|---|---|---|---|---|---|
| Part 1 of an unmap command | First clock cycle rising edge | L | H | L | L | L | L | V | OPCODE[0] |
|  | First clock cycle falling edge | L |  |  |  | ADDR[11:5] |  |  |  |
| Part 2 of the unmap command | Second clock cycle rising edge | H |  | ADDR[4:1] |  |  |  | RFU |  |
|  | Second clock cycle falling edge | H |  |  |  | LENGTH[6:0] |  |  |  |
| Part 1 of an address extension command | Third clock cycle rising edge | L |  |  |  | ADDR[39:33] |  |  |  |
|  | Third clock cycle falling edge | L |  |  |  | ADDR[32:25] |  |  |  |
| Part 2 of the address extension command | Fourth clock cycle rising edge | H |  |  |  | ADDR[26:19] |  |  |  |
|  | Fourth clock cycle falling edge | H |  |  |  | ADDR[18:12] |  |  |  |

Similar to the first possible implementation, due to a limited length of the unmap command, the unmap command cannot carry complete address information of the to-be-reclaimed memory block. Therefore, after sending the unmap command, the memory controller usually further sends an address extension command. The unmap command and the address extension command are sent back-to-back. In an embodiment, the memory controller alternately sends the unmap command and the address extension command. Different from the first possible implementation, in this implementation, both the unmap command and the address extension command need to spend two clock cycles in sending, and each clock cycle includes one clock rising edge and one clock falling edge. In this embodiment, after sending the first part of the unmap command on the two clock edges of the first clock cycle, the memory controller sends the second part of the unmap command on the two clock edges of the second clock cycle, and then the memory controller sends the first part of the address extension command on the two clock edges of the third clock cycle and then sends the second part of the address extension command on the two clock edges of the fourth clock cycle. The memory controller sends other unmap commands and address extension commands in sequence at subsequent clock beats. A format of the address extension command is also shown in Table 2.

In the unmap command and the address extension command, H represents binary data 1, and L represents binary data 0. CS is a chip select signal. When it is detected that the CS is L in the first clock cycle, it indicates that the unmap command or the address extension command starts. For the unmap command or the address extension command in the second clock cycle, when it is detected that the CS is H, it indicates that the second part of the unmap command or the address extension command is received. However, when it is still detected that the CS is L in the second clock, it indicates that an error occurs in the unmap command or the address extension command. In this case, the unmap command or the address extension command in the two clock cycles may be discarded, or the unmap command or the address extension command in the first clock cycle may be discarded. The ADDR[39:1] field is used to indicate the start address of the to-be-reclaimed memory block. In other words, the ADDR[39:1] field is used to indicate the start address of the first to-be-reclaimed memory block. The LENGTH[6:0] is used to indicate the length information of the to-be-reclaimed memory block, and may be further used to indicate a quantity of the to-be-reclaimed memory blocks. Using the LENGTH[6:0] as an example, a maximum value of the LENGTH[6:0] field is 128. In this case, one unmap command may be used to instruct to reclaim 128 memory blocks. The OPCODE[0] field is used to indicate erasure mode information.

S302. The medium controller deletes the mapping relationship between the memory logical address and the corresponding memory physical address of the memory block based on the memory logical address information. Further, after receiving the unmap command, the medium controller may determine, based on first memory logical address information in the unmap command, a first memory physical address corresponding to a first memory logical address. In this case, the medium controller may delete a mapping relationship between the first memory logical address and the first memory physical address such that there is no corresponding memory logical address for the first memory physical address, and the medium controller may allocate a new memory logical address to the first memory physical address. If the mapping relationship between the first memory logical address and the first memory physical address is not deleted, the medium controller can access the first memory physical address only when the memory controller accesses the first memory logical address next time. However, an interval between the two accesses may be very long such that a quantity of erasure/write times of the first memory physical address is definitely less than a quantity of erasure/write times of another memory block in the NVM. This may affect a service life of the NVDIMM.

S303. The medium controller adds the memory physical address of the memory block to a memory idle list. In this embodiment of the present disclosure, a memory block corresponding to a memory physical address for which there is no corresponding memory logical address is an available memory block, and the medium controller adds the memory physical address to the memory idle list. In this embodiment of the present disclosure, the memory block indicated in the memory idle list is an available memory block. In other words, when a memory block needs to be allocated to a new access request, the medium controller may allocate the memory block based on the memory idle list. In an actual application, memory blocks in the memory idle list may be arranged in ascending order of quantities of write times of the memory blocks. In a process of allocating a memory block, the medium controller may preferentially allocate a memory block with a small quantity of erasure/write times. Certainly, in an actual application, the medium controller may alternatively randomly allocate a memory block. This is not limited herein. In a computer system including an NVDIMM according to this embodiment of the present disclosure, the memory controller may send the unmap command to the medium controller according to the NVDIMM-P protocol, to instruct the medium controller to reclaim the memory block. After receiving the unmap command, the medium controller may delete the mapping relationship between the memory logical address and the corresponding memory physical address of the memory block based on memory logical address information carried in the unmap command, and reclaim the corresponding memory block.

In this manner in which the memory controller sends the unmap command to the medium controller according to this embodiment of the present disclosure, the medium controller can delete the mapping relationship between the memory logical address and the corresponding memory physical address of the memory block in time such that a quantity of available memory blocks can be increased, a wear leveling effect between memory blocks can be enhanced, performance of the NVDIMM can be prolonged, and a service life of the NVDIMM can be prolonged. In this way, the memory module is managed when the NVDIMM is used as a memory.

A person skilled in the art may know that, because the NVM chip supports writing by byte, during memory update, data in a memory block may be directly rewritten, and erasure and garbage collection do not need to be performed on an unused memory block in advance. In this case, in an actual application, to improve a processing speed, when a memory block is released, a reclaimed memory block may not be erased. However, for sensitive data, there may be a risk of leakage of unerased data. Therefore, in this embodiment of the present disclosure, as shown in Table 1 and Table 2, the unmap command may further include the OPCODE [0] field. The OPCODE[0] field is used to indicate erasure mode information. Further, the medium controller may determine, based on the erasure mode indication information of the OPCODE[0] field in the unmap command, whether the data block needs to be erased. For example, when a value of the OPCODE[0] is 0, it indicates that data information in the memory block does not need to be erased. When a value of the OPCODE[0] is 1, it indicates that data information in the memory block needs to be erased.

Further, as shown in FIG. 3, after S302, the memory block reclamation method may further include the following step.

S304. When the erasure mode indication information instructs to erase the data information in the memory block, the medium controller writes pre-defined pattern into the memory block. For example, in this embodiment of the present disclosure, when a value of the OPCODE[0] is 1, the medium controller deletes the mapping relationship between the memory logical address and the corresponding memory physical address of the memory block. After the memory block is reclaimed, the medium controller may write the pre-defined pattern into the reclaimed memory block, to overwrite original data in the memory block, and prevent leakage of the sensitive data in memory blocks. In an actual application, the pre-defined pattern may be stored in a preset register. The pre-defined pattern may be all 0s, all 1s, or any other predefined data. This is not limited herein. In an actual application, S304 may be performed before S303, or may be performed after S303, or may be performed simultaneously with S303. This is not limited in the present disclosure.

In the memory block reclamation method according to this embodiment of the present disclosure, the unmap command further includes erasure mode indication information such that when data in the memory block is sensitive data, the medium controller may be instructed to overwrite the sensitive data using pre-defined pattern, thereby protecting the sensitive data and improving security of the NVDIMM.

Figure 4:
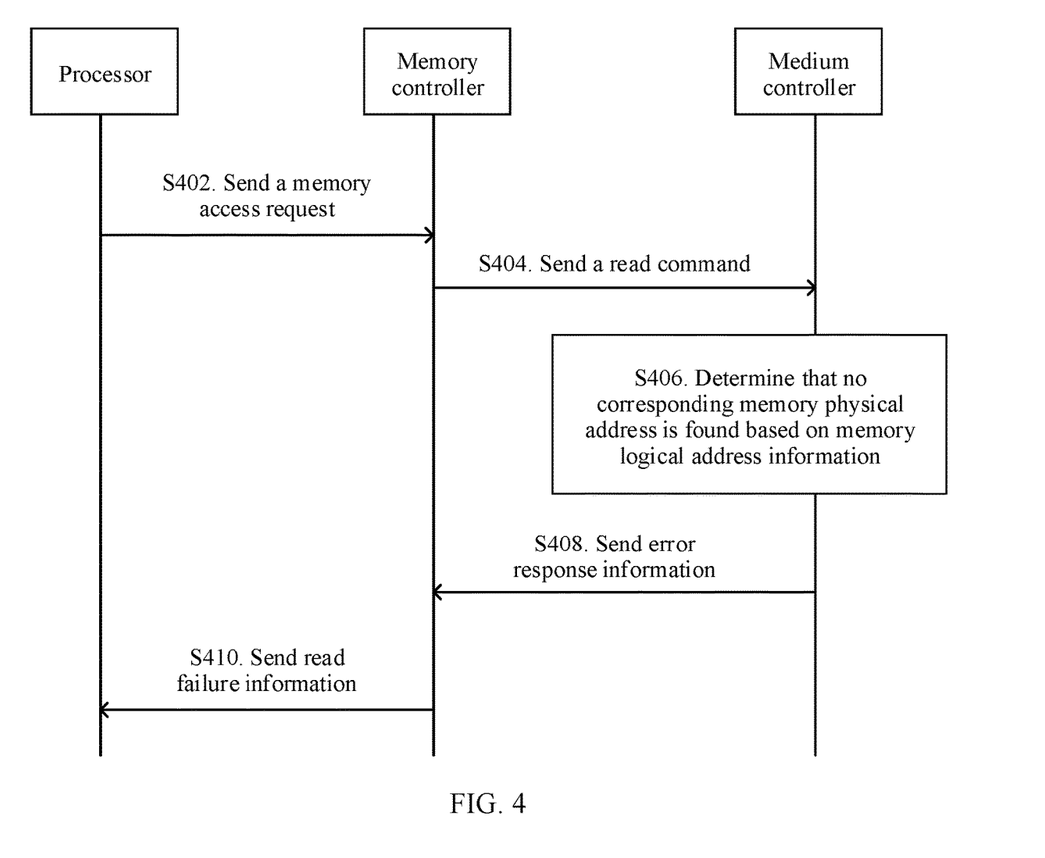
FIG. 4 is a flowchart of a data reading method according to an embodiment of the present disclosure.

Further, in an actual application, there may be a case in which a plurality of processors or a plurality of processor cores access a same memory block. In this case, after a memory block is reclaimed, there may be a case in which another processor accesses the memory block. The following describes in detail a data reading process that is between a memory controller and a medium controller and that is after a memory block is reclaimed. FIG. 4 is a flowchart of a data reading method according to an embodiment of the present disclosure. As shown in FIG. 4, the method may include the following steps.

S402. A memory controller receives a memory access request sent by a processor, where the memory access request includes memory logical address information of to-be-read data. In this embodiment of the present disclosure, memory logical address information in the memory access request is the same as the memory logical address information in the trim command described in the foregoing embodiment.

S404. The memory controller sends a read command to a medium controller. Further, the memory controller sends the read command to the medium controller based on the received memory access request, where the read command is used to read data in the memory block, and the memory access request carries the memory logical address of the to-be-accessed memory block.

S406. The medium controller determines that no corresponding memory physical address is found based on the memory logical address information. After receiving the read command, the medium controller queries for a memory physical address corresponding to the memory logical address in the read command. Because the memory logical address information in the read command is the same as the memory logical address information in the trim command, the medium controller has reclaimed, based on the trim instruction, the memory block corresponding to the memory logical address. Therefore, the medium controller cannot find the corresponding memory physical address based on the memory logical address information.

S408. The medium controller sends error response information to the memory controller. The error response information is used to indicate that the read command fails to be executed. As described above, because the medium controller cannot find the corresponding memory physical address based on the memory logical address information, the medium controller cannot obtain corresponding data from the corresponding physical address and return the data to the memory controller. Therefore, in this step, the medium controller may send the error response information to the memory controller, to notify the memory controller that the read command fails to be executed.

S410. The memory controller sends read failure information to the processor based on the error response information. For example, after receiving the error response information sent by the medium controller, the memorycontroller may further send the read failure information to the processor based on the error response information, where the read failure information is used to notify the processor that the read command fails to be executed.

Optionally, when receiving the error response information, the memory controller needs to determine an error type based on error type indication information carried in the error response information. Further, the memory controller may determine the error type in the received error response information based on a preset mapping relationship between the error type indication information and a failure type. The preset mapping relationship between the error type indication information and the failure type may be stored in a mode register.

Optionally, in this embodiment of the present disclosure, the error response information includes the error type indication information and error indication information (for example, information indicated by a poison bit). The error indication information is used to indicate that the read command fails to be executed, and the error type indication information is used to indicate a failure type. Failure types include error data, an uncorrectable check code error, a medium error, and a memory channel error.

For example, the error response information includes a poison bit. When a value of the poison bit is 0, it indicates that the read command is successfully executed. When a value of the poison bit is 1, it indicates that the read command fails to be executed. The error response information further includes the error type indication information that is used to indicate a type of a read-command execution failure. For example, the memory controller determines, based on the value of the poison bit in the error response information being 1, that the read command fails to be executed, and may determine, based on the error type indication information, the type of the read-command execution failure is no memory physical address corresponding to the memory block. For example, different values of the error type indication information may represent different error types. The error type may further be error data, an uncorrectable check code error, a medium error, a memory channel error, or the like.

In one case, when the DDR4 interface is used between the medium controller and the memory controller, a possible format of the error response information is shown in the following Table 3.

DDR4, at least 4 clock cycles are required to send error response information. As shown in Table 3, in the error response information shown in this embodiment of the present disclosure, the RID[7:0] field is used to indicate an identifier (ID) of the read command. The error indication information is used to indicate whether the read command is incorrect. An error type indication information field is used to indicate an error type. The error correcting code (ECC) field is used to indicate correcting information of transmitted data. The RFU field is a reserved field.

In another case, when the DDR5 interface is used between the medium controller and the memory controller, a possible format of the error response information is shown in the following Table 4.

TABLE 4

| Clock beat | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| DQ0-DQ31 | | | | | | Error type indication information | | | | | | | | | | |
| CB0-CB5 | | | | | | | | ECC | | | | | | | | |
| CB6 | Error indication information | RFU | RFU | RFU | RFU | RID[0] | RID[8] | RID[7] | RID[6] | RID[5] | RFU | RFU | RFU | RFU | RFU | RFU |
| CB7 | RFU | RFU | RFU | RFU | RFU | RID[4] | RID[3] | RID[2] | RID[1] | RID[0] | RFU | RFU | RFU | RFU | RFU | RFU |

Different from the error response information shown in Table 3, in the DDR5, a data line includes a comparatively small quantity of bits, and a DQ is 32-bit. In this case, to transmit error response information with a same quantity of bits, a quantity of clock beats required in the DDR5 is greater than a quantity of clock beats required in the DDR4.

The read failure information sent by the memory controller to the processor may include the error type indication information and the error indication information. Optionally, the read failure information may alternatively be error indication information, and the error indication information is used only to indicate a read failure.

Another aspect of the embodiments of the present disclosure further provides a memory. For example, the memory may be the NVDIMM in FIG. 1. A structure of the memory may be shown in the NVDIMM in FIG. 1, and the memory includes a medium controller 110 and a NVM (for example, the NVM 112 in FIG. 1) connected to the medium controller 110. The medium controller 110 communicates with the memory controller 106 of the processor using the NVDIMM-P protocol, and the NVM includes a plurality of

TABLE 3

| | UI0 | UI1 | UI2 | UI3 | UI4 | UI5 | UI6 | UI7 |
|---|---|---|---|---|---|---|---|---|
| DQ0-DQ63 | | | Error type indication information | | | | | |
| CB0-CB5 | | | | | ECC | | | |
| CB6 | Error indication information | RFU | RFU | RFU | RID[7] | RID[6] | RID[5] | RID[4] |
| CB7 | RFU | RFU | RFU | RFU | RID[3] | RID[2] | RID[1] | RID[0] |

DQ0 to DQ63 and CB0 to CB7 all are data lines, and are used to transmit data. UI0 to UI7 are clock lines, indicating clock beats used during data transmission. For example, UI0 is the first clock beat and is a rising clock edge, and UI1 is the second clock beat and is a falling clock edge. In the memory blocks. The medium controller 110 may, for example, perform the memory block reclamation methods in FIG. 2 to FIG. 4. Further, the medium controller 110 is configured to receive an unmap command sent by the memory controller 106, where the unmap command includes memory logical address information of a to-be-reclaimed memory block, and reclaim the memory block based on the memory logical address information, where the reclaimed memory block is an available memory block.

Optionally, the medium controller 110 is further configured to delete a mapping relationship between a memory logical address and a corresponding memory physical address of the memory block based on the memory logical address information, and add the memory physical address of the memory block to a memory idle list.

Optionally, the memory logical address information includes a start address and length information of the to-be-reclaimed memory block, the start address is used to indicate a first address of the to-be-reclaimed memory block, and the length information is used to indicate a quantity of to-be-reclaimed memory blocks.

Optionally, the unmap command further includes erasure mode indication information, and the medium controller 110 is further configured to, when the erasure mode indication information instructs to erase data information in the memory block, write pre-defined pattern into the memory block.

Optionally, the medium controller 110 is further configured to receive a read command sent by the memory controller 106, where the read command includes memory logical address information of to-be-read data, determine that no corresponding memory physical address is found based on the memory logical address information, and send error response information to the memory controller 106, where the error response information is used to indicate that the read command fails to be executed.

Another aspect of the embodiments of the present disclosure further provides a computer system. A structure of the computer system is shown in FIG. 1, and the computer system includes a processor 102, a memory controller 106, a medium controller 110, and a NVM (for example, the NVM 112 in FIG. 1) connected to the medium controller 110. The memory controller 106 communicates with the medium controller 110 using an NVDIMM-P protocol, the NVM includes a plurality of memory blocks, and the memory controller 106 is configured to receive a trim instruction sent by the processor 102, where the trim instruction includes memory logical address information of a to-be-reclaimed memory block, and send an unmap command to the medium controller 110, where the unmap command includes the memory logical address information of the to-be-reclaimed memory block, and the unmap command is used to instruct the medium controller 110 to reclaim the memory block.

The medium controller 110 is configured to receive an unmap command sent by the memory controller 106, and reclaim the memory block based on the memory logical address information, where the reclaimed memory block is an available memory block.

Optionally, the memory logical address information includes a start address and length information of the to-be-reclaimed memory block, the start address is used to indicate a first address of the to-be-reclaimed memory block, and the length information is used to indicate a quantity of to-be-reclaimed memory blocks.

Optionally, the unmap command further includes erasure mode indication information, and the medium controller 110 is further configured to, when the erasure mode indication information instructs to erase data information in the memory block, write pre-defined pattern into the memory block.

Optionally, the memory controller 106 is further configured to receive a memory access request sent by a processor, where the memory access request includes memory logical address information of to-be-read data.

The memory controller 106 is further configured to send a read command to the medium controller 110 based on the memory access request, where the read command carries the memory logical address information.

The medium controller 110 is further configured to determine that no corresponding memory physical address is found based on the memory logical address information, and send error response information to the memory controller 106, where the error response information is used to indicate that the read command fails to be executed.

The memory controller 106 is further configured to send read failure information to the processor based on the error response information.

It should be noted that the embodiments provided in the present disclosure are merely examples. A person skilled in the art may clearly know that, for convenience and conciseness of description, in the foregoing embodiments, the embodiments emphasize different aspects, and for a part not described in detail in an embodiment, refer to relevant description of another embodiment. The embodiments of the present disclosure, claims, and features disclosed in the accompanying drawings may exist independently, or exist in a combination. Features described in a hardware form in the embodiments of the present disclosure may be executed by software, and vice versa. This is not limited herein.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

All or some of the foregoing embodiments may be implemented by means of software, hardware, firmware, or any combination thereof. When a software program is used to implement the embodiments, all or some of the embodiments may be implemented in a form of a computer program product. The computer program product includes one or more computer instructions. When the computer program instructions are loaded and executed on the computer, all or some of the procedures or functions according to the embodiments of the present disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be various non-transitory machine-readable media that can store program code, such as a magnetic medium (for example, a floppy disk, a hard disk, or a magnetic tape), an optical medium (for example, a digital versatile disc (DVD)), or a semiconductor medium (for example, a solid state disk (SSD)).

It should be noted that the embodiments provided in the present disclosure are merely examples. A person skilled in the art may clearly know that, for convenience and conciseness of description, in the foregoing embodiments, the embodiments emphasize different aspects, and for a part not described in detail in an embodiment, refer to relevant description of another embodiment. The embodiments of the present disclosure, claims, and features disclosed in the accompanying drawings may exist independently, or exist in a combination. Features described in a hardware form in the embodiments of the present disclosure may be executed by software, and vice versa. This is not limited herein.

The invention claimed is:

1. A memory block reclamation method implemented by a medium controller in a computer system, wherein the memory block reclamation method comprises:
   receiving from a memory controller in the computer system and using a non-volatile dual in-line memory module (NVDIMM) protocol (NVDIMM-P), and unmap command comprising memory logical address information of one or more to-be-reclaimed memory blocks in a non-volatile memory in the computer system;
   receiving, from the memory controller and subsequent to receiving the unmap command, an address extension command comprising length information indicating a quantity of the one or more to-be-reclaimed memory blocks; and
   reclaiming, in response to the unmap command and the address extension command, the one or more of the to-be-reclaimed memory blocks based on the memory logical address information and length information to obtain one or more reclaimed memory blocks,
   wherein one or more of the reclaimed memory blocks are available memory blocks.

2. The memory block reclamation method of claim 1, further comprising:
   deleting a mapping relationship between a memory logical address and a corresponding memory physical address of each memory block of the one or more to-be-reclaimed memory blocks based on the memory logical address information and length information; and
   adding the corresponding memory physical address to a memory idle list.

3. The memory block reclamation method of claim 1, wherein the memory logical address information comprises a start address indicating a first address of one or more of the to-be-reclaimed memory blocks.

4. The memory block reclamation method of claim 1, wherein the unmap command further comprises erasure mode indication information, and wherein the memory block reclamation method further comprises writing a pre-defined pattern into the one or more to-be-reclaimed memory blocks when the erasure mode indication information instructs to erase data in the one or more to-be-reclaimed memory blocks.

5. The memory block reclamation method of claim 1, further comprising:
   receiving a read command from the memory controller, wherein the read command comprises memory logical address information of to-be-read data;
   making a determination that no corresponding memory physical address is found based on the memory logical address information of the to-be-read data; and
   sending error response information to the memory controller in response to the determination, wherein the error response information indicates that the read command fails to be executed.

6. The memory block reclamation method of claim 1, wherein the unmap command and the address extension command respectively correspond to successive clock cycles.

7. A memory system, comprising:
   a non-volatile memory; and
   a medium controller coupled to the non-volatile memory and configured to:
      receive, from a memory controller and using a non-volatile dual in-line memory module (NVDIMM) protocol (NVDIMM-P), an unmap command comprising memory logical address information of one or more to-be-reclaimed memory blocks in a non-volatile memory;
      receive, from the memory controller and subsequent to receiving the unmap command, an address extension command that comprises length information indicating a quantity of the one or more to-be-reclaimed memory blocks; and
      reclaim, in response to the unmap command and the address extension command, the one or more of the to-be-reclaimed memory blocks based on the memory logical address information and length information to obtain one or more reclaimed memory blocks,
      wherein one or more of the reclaimed memory blocks are available memory blocks.

8. The memory system of claim 7, wherein the medium controller is further configured to:
   delete a mapping relationship between a memory logical address and a corresponding memory physical address of each of the one or more to-be-reclaimed memory blocks based on the memory logical address information and length information; and
   add the corresponding memory physical address to a memory idle list.

9. The memory system of claim 7, wherein the memory logical address information comprises a start address indicating a first address of the one or more to-be-reclaimed memory blocks.

10. The memory system of claim 7, wherein the unmap command further comprises erasure mode indication information, and wherein the medium controller is further configured to write a pre-defined pattern into the one or more to-be-reclaimed memory blocks when the erasure mode indication information instructs to erase data in the one or more to-be reclaimed memory blocks.

11. The memory system of claim 7, wherein the medium controller is further configured to:
   receive a read command from the memory controller, wherein the read command comprises memory logical address information of to-be-read data;
   make a determination that no corresponding memory physical address is found based on the memory logical address information of the to-be-read data; and
   send error response information to the memory controller in response to the determination, wherein the error response information indicates that the read command fails to be executed.

12. A system comprising:
a processor configured to send a trim instruction comprising memory logical address information of one or more to-be-reclaimed memory blocks;
a memory controller coupled to the processor and configured to:
receive the trim instruction;
send an unmap command to reclaim the one or more to-be-reclaimed memory blocks in a non-volatile memory, wherein the unmap command comprises the memory logical address information of the one or more to-be-reclaimed memory blocks; and
send an address extension command that comprises length information indicating a quantity of the one or more to-be-reclaimed memory blocks; and
a medium controller coupled to the memory controller and configured to:
receive the unmap command from the memory controller and using a non-volatile dual in-line memory module (NVDIMM) protocol (NVDIMM-P);
receive, from the memory controller and subsequent to receiving the unmap command, an address extension command that comprises length information indicating a quantity of the one or more to-be-reclaimed memory blocks; and
reclaim, in response to the unmap command and the address extension command, the one or more to-be-reclaimed memory blocks from the non-volatile memory based on the memory logical address information and length information to obtain one or more reclaimed memory blocks,
wherein the non-volatile memory is coupled to the medium controller, and wherein one or more of the reclaimed memory blocks are available memory blocks.

13. The system of claim 12, wherein the memory logical address information comprises a start address indicating a first address of the one or more to-be-reclaimed memory blocks.

14. The system of claim 12, wherein the unmap command further comprises erasure mode indication information and wherein the medium controller is further configured to write pre-defined pattern into the one or more to-be-reclaimed memory blocks when the erasure mode indication information instructs to erase data in the one or more to-be-reclaimed memory blocks.

15. The system of claim 12, wherein the memory controller is further configured to:
receive a memory access request from the processor, wherein the memory access request comprises memory logical address information of to-be-read data;
send a read command to the medium controller based on the memory access request, wherein the read command carries the memory logical address information of the to-be-read data, and
wherein the medium controller is further configured to:
make a determination that no corresponding memory physical address is found based on the memory logical address information of the to-be-read data; and
send error response information to the memory controller in response to the determination, wherein the error response information indicates that the read command fails to be executed.

16. The system of claim 12, wherein is-during reclaiming the one or more to-be-reclaimed memory blocks from the non-volatile memory, the medium controller is further configured to:
delete a mapping relationship between a memory logical address and a corresponding memory physical address of each of the one or more to-be-reclaimed memory blocks based on the memory logical address information and length information; and
add the corresponding memory physical address to a memory idle list.

17. The system of claim 12, wherein before the processor sends the trim instruction, the processor is further configured to detect that one to-be-reclaimed memory block of the one or more to-be-reclaimed memory blocks exceeds a preset size.

18. The system of claim 12, wherein before the processor sends the trim instruction, the processor is further configured to detect that an application has ended.

19. The system of claim 12, wherein before the processor sends the trim instruction, the processor is further configured to detect a quantity of read requests or write requests.

20. The system of claim 12, wherein before the processor sends the trim instruction, the processor is further configured to determine that the trim instruction needs to be sent based on a preset operating system memory management algorithm.

* * * * *

UNITED STATES PATENT AND TRADEMARK OFFICE
CERTIFICATE OF CORRECTION

PATENT NO. : 11,886,333 B2
APPLICATION NO. : 18/194182
DATED : January 30, 2024
INVENTOR(S) : Florian Longnos and Wei Yang Page 1 of 1

It is certified that error appears in the above-identified patent and that said Letters Patent is hereby corrected as shown below:

In the Claims

Claim 1, Column 19, Line 24: "(NVDIMM-P), and" should read "(NVDIMM-P), an"

Claim 15, Column 22, Line 19: "wherein is-during" should read "wherein during"

Signed and Sealed this
Second Day of April, 2024

Katherine Kelly Vidal
*Director of the United States Patent and Trademark Office*